United States Patent
Nakagawa et al.

(10) Patent No.: US 7,147,565 B2
(45) Date of Patent: Dec. 12, 2006

(54) FIXED TYPE CONSTANT VELOCITY JOINT

(75) Inventors: Tohru Nakagawa, Shizuoka-ken (JP); Masazumi Kobayashi, Shizuoka-ken (JP); Masamichi Nakamura, Shizuoka-ken (JP); Hiroshi Tone, Shizuoka-ken (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 10/774,686

(22) Filed: Feb. 10, 2004

(65) Prior Publication Data

US 2004/0180724 A1    Sep. 16, 2004

(30) Foreign Application Priority Data

Feb. 18, 2003   (JP)   ............... 2003-040115

(51) Int. Cl.
*F16D 3/224*   (2006.01)
(52) U.S. Cl. ...................... 464/145; 464/906
(58) Field of Classification Search ................ 464/145, 464/906
See application file for complete search history.

(56) References Cited

U.S. PATENT DOCUMENTS

| | | |
|---|---|---|
| 2,238,647 A | 4/1941 | Ivandick |
| 3,076,323 A | 2/1963 | Aucktor |
| 3,789,624 A | 2/1974 | Camosso |
| 5,122,096 A | 6/1992 | Aucktor et al. |
| 5,221,233 A | 6/1993 | Jacob |
| 5,242,329 A | 9/1993 | Jacob |
| 5,632,683 A * | 5/1997 | Fukumura et al. ...... 464/145 X |
| 6,120,382 A | 9/2000 | Sone et al. |
| 6,267,682 B1 | 7/2001 | Sone et al. |
| 6,506,122 B1 | 1/2003 | Nakagawa et al. |

FOREIGN PATENT DOCUMENTS

DE    100 60 220 A1    6/2002

\* cited by examiner

*Primary Examiner*—Greg Binda
(74) *Attorney, Agent, or Firm*—Arent Fox PLLC

(57) ABSTRACT

A fixed type constant velocity joint is disclosed in which the angle defined by a straight line connecting a contact point between a cage and an outer joint member and a contact point between the cage and an inner joint member, and the centerline of the cage is made not more than 10 degrees.

4 Claims, 9 Drawing Sheets

RELATION BETWEEN ANGLE ($\alpha$) DEFINED BY CAGE-INNER AND OUTER DIAMETER CONTACT POINTS AND CAGE STRENGTH

FIXED TYPE CONSTANT VELOCITY JOINT

BACKGROUND OF THE INVENTION

1. Field of the Invention

The present invention relates to a fixed type constant velocity joint in which a rotary shaft on the driving side and a rotary shaft on the driven side are connected together and which is capable of transmitting torque at constant angular velocities even when the two shafts form an angle. It is capable of angular displacement alone without plunging, and is utilized in automobiles and various industrial machines.

2. Brief Description of the Prior Art

While the connecting construction of the drive shaft of an automobile differs according to the vehicle suspension system, a differential gear, or a final reduction gear, is attached to the vehicle body side, for example, in a vehicle employing an independent suspension system, and the opposite ends of the drive shaft are connected to the differential and the axle, respectively, through universal joints. And in order to allow displacement of the drive shaft in response to the movement of the suspension, the construction is such as to allow angular displacement of the drive shaft in the wheel-side connection and angular displacement and axial displacement in the vehicle body-side connection.

As for the above-mentioned universal joints, constant velocity joints are frequently used at present, and the wheel-side connection uses the fixed type constant velocity joints which allow only the angular displacement of the two shafts, such as the Rzeppa type, while the vehicle body-side connection uses the slide type constant velocity joints which allow angular displacement and axial displacement between the two shafts, such as the double offset type, tripod type, and cross group type.

A fixed type constant velocity joint shown in FIGS. 9A and 9B comprises an outer joint member 1 having six curved guide grooves 1b axially formed in a spherical inner peripheral surface 1a, an inner joint member 2 having six curved guide grooves 2b axially formed in a spherical outer peripheral surface 2a, and having spline (or serration) holes 2c, torque transmitting balls 3 disposed one by one in six ball tracks defined by cooperation between the guide grooves 1b of the outer joint member 1 and the guide grooves 2b of the inner joint member 2, and a cage 4 holding the torque transmitting balls 3.

The center of curvature of the inner peripheral surface 1a of the outer joint member 1 and the center of curvature of the outer peripheral surface 2a of the inner joint member 2 are each coincident with the joint center O. The center of curvature A of each of the guide grooves 1b of the outer joint member 1 and the center of curvature B of each of the guide grooves 2b of the inner joint member 2 are axially offset by an equal distance on opposite sides of the joint center O (in the example shown in the same figure, the center A is on the opening side of the joint and the center B is on the innermost side of the joint). Therefore, the ball tracks defined by cooperation between the guide grooves 1b and 2b are wedge-shaped, opening to one axial side (in the example shown in the same figure, to the opening side of the joint).

In the case where the two shafts make no angular displacement, that is, the axes of rotation of the two shafts form a straight line, as shown in FIG. 9A, the centers of all of the torque transmitting balls 3 are in a plane perpendicular to the axis of rotation including the joint center O. When the outer and inner joint members 1 and 2 make an angular displacement by an angle θ, the cage 4 places the torque transmitting balls 3 in a plane bisecting the angle θ, thereby securing the constant velocity property of the joint.

A conventional fixed type constant velocity joint is known to have eight torque transmitting balls in order to realize further size compaction and weight reduction while securing strength, loading capacity and durability exceeding that provided by a fixed type constant velocity joint having six torque transmitting balls as shown in FIGS. 9A and 9B.

One of the main damages to fixed type constant velocity joints during high-angle operation is a mode called cage column shear fracture caused by spherical edge cutting-in of the outer and inner joint members. FIG. 3 is an enlarged sectional view for explaining a damage mode of a fixed type constant velocity joint, showing the vicinity of a torque transmitting ball positioned outermost when a maximum operating angle is taken. As can be seen from the same view, when the spherical edge contact points (loading points) of the outer and inner joint members are greatly offset axially of the cage, the shear stress in the cage column increases, imposing an excessive moment load thereon, so that the cage strength considerably lowers.

SUMMARY OF THE INVENTION

An object of the invention is to mitigate such shear stress in the cage column and secure the cage strength in a fixed type constant velocity joint.

The present invention mitigates the shear stress in the cage column to secure the cage strength by setting the axial offset amount of the spherical edge contact points (loaded points) of the outer and inner joint members at an optimum value.

That is, a fixed type constant velocity joint according to an embodiment of the invention comprises an outer joint member having axially extending guide grooves formed in the spherical inner peripheral surface thereof, an inner joint member having axially extending guide grooves formed in the spherical outer peripheral surface thereof, torque transmitting balls disposed one by one in ball tracks defined by cooperation between the guide grooves of the outer and inner joint members, and a cage holding the torque transmitting balls, wherein the angle α defined between a straight line connecting a contact point between the cage and the outer joint member and a contact point between the cage and the inner joint member, and the cage center line is not more than 10 degrees.

According to the invention, it is possible to provide a fixed type constant velocity joint having the shearing stress in the cage column mitigated and securing the cage strength by making the angle defined by a straight line connecting the contact point between the cage and the outer joint member and the contact point between the cage and the inner joint member, and the centerline of the cage not more than 10 degrees.

The number of guide grooves of the outer joint member may be eight and so is the number of guide grooves of the inner joint member.

The guide grooves of the outer and inner joint members may be provided with straight sections having a straight groove bottom.

DESCRIPTION OF THE PREFERRED EMBODIMENTS

Embodiments of the invention will now be described with reference to the drawings. First, the basic construction of a fixed type constant velocity joint will be described with reference to FIGS. 5 through 7.

Figure 5:
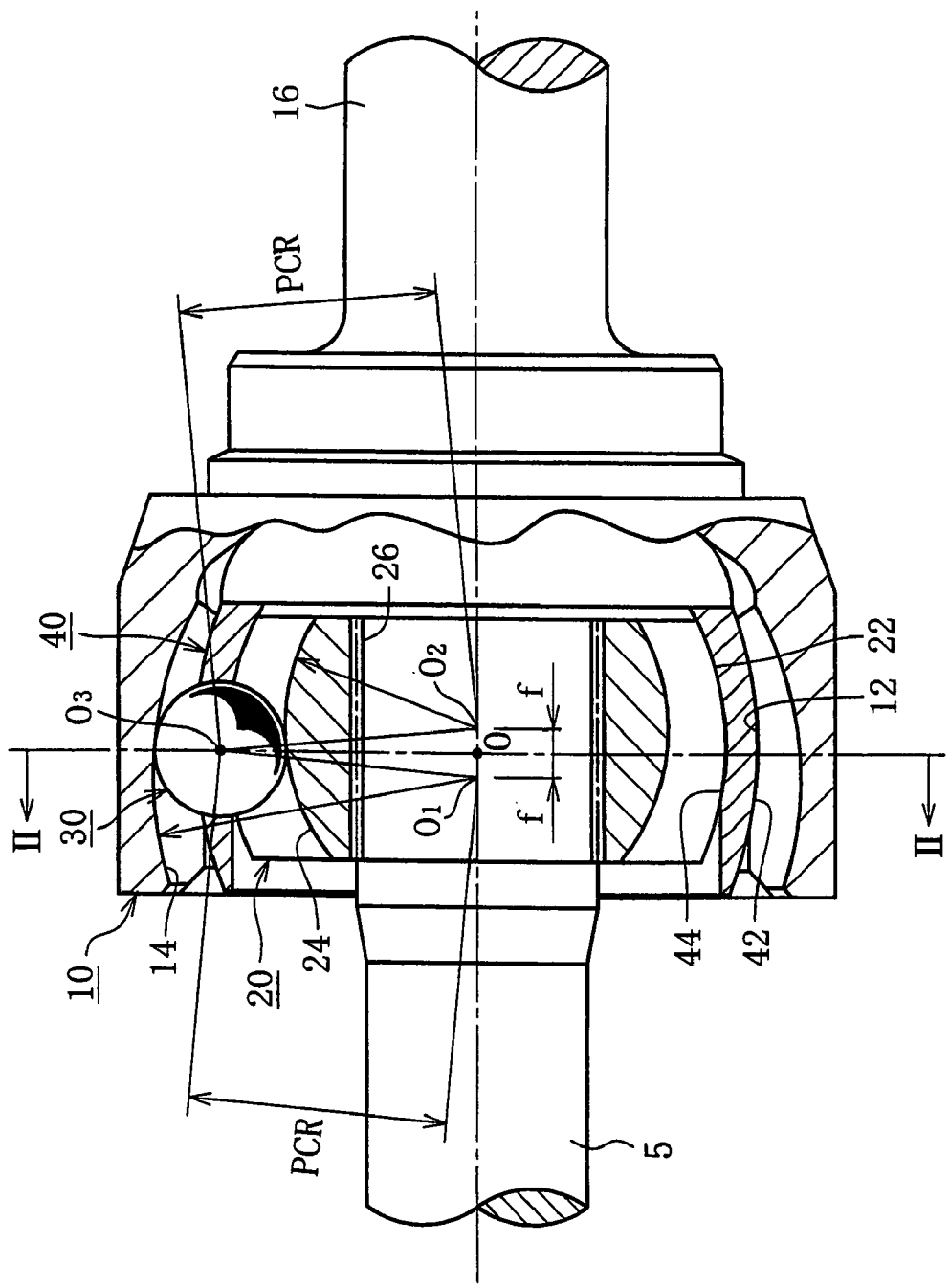
FIG. 5 is a longitudinal sectional view of a fixed type constant velocity joint.
Figure 6:
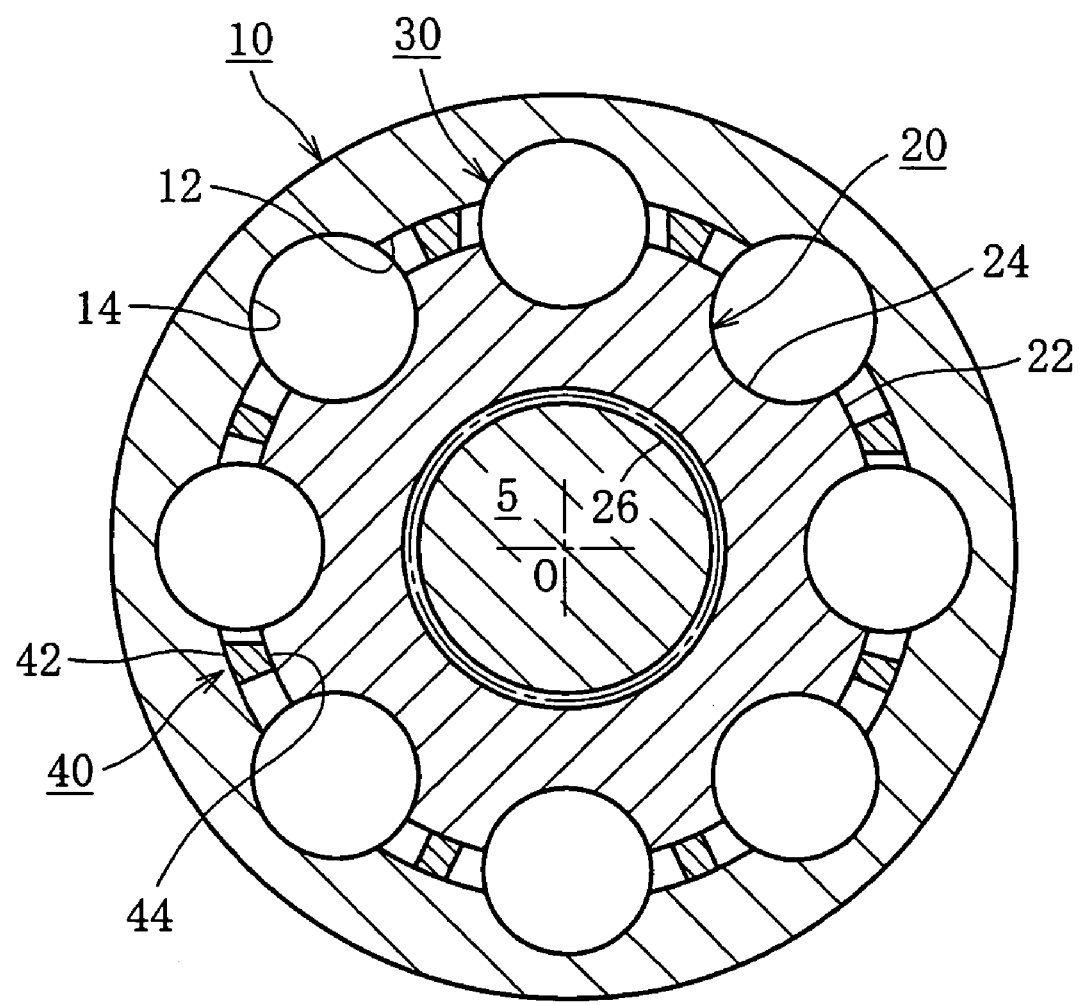
FIG. 6 is a cross sectional view of the fixed type constant velocity joint of FIG. 5.

In the embodiment shown in FIGS. 5 and 6, the fixed type constant velocity joint comprises an outer joint member 10, an inner joint member 20, torque transmitting balls 30, and a cage 40.

The outer joint member 10, which is cup-shaped with one axial end opened, has a spherical inner peripheral surface 12 formed with arcuate (FIG. 5) guide grooves 14 at eight circumferentially equispaced positions (FIG. 6). The center of curvature of the guide grooves 14 is denoted by O1 in FIG. 5. In addition, FIG. 5 illustrates a case where a shaft 16 is formed integral with the outer joint member 10.

The inner joint member 20 has a spherical outer peripheral surface 22 formed with arcuate (FIG. 5) guide grooves 24 at eight circumferentially equispaced positions (FIG. 6). The center of curvature of the guide grooves 24 is denoted by O2 in FIG. 5. FIG. 5 illustrates a case where the inner joint member 20 has spline holes 26 and is fitted on the spline shaft of the shaft 5 through the spline holes 26.

The guide grooves 14 of the outer joint member 10 are paired with the guide grooves 24 of the inner joint member 20, forming a total of eight ball tracks. And the torque transmission balls 30 are disposed one by one in the ball tracks. The center of the torque transmitting balls 30 is denoted by O3 in FIG. 5.

The torque transmitting balls 30 are held by the cage 40. The cage 40 has a spherical outer peripheral surface 42 and a spherical inner peripheral surface 44. The outer peripheral surface 42 is spherically fitted on the inner peripheral surface 12 of the outer joint member 10, while the inner peripheral surface 44 is spherically fitted on the outer peripheral surface 22 of the inner joint member 20. The center of curvature of the outer peripheral surface 42 of the cage 40 and the center of curvature of the inner peripheral surface 12 of the outer joint member 10 serving as a guide surface for the outer spherical surface 42 of the cage 40 each coincide with the joint center O. Further, the center of curvature of the inner peripheral surface 44 of the cage 40 and the center of curvature of the outer peripheral surface 22 of the inner joint member 20 serving as a guide surface for the inner peripheral surface 44 of the cage 40 each coincide with the joint center O.

In this embodiment, the center of curvature O1 of the guide grooves 14 of the outer joint member 10 and the center of curvature O2 of the guide grooves 24 of the inner joint member 20 are offset to opposite sides of the joint center O by an axially equal distance f (in the example shown, the center O1 is on the opening side of the joint, and the center O2 is on the innermost side of the joint). In other words, the amount of offset f of the center of curvature O1 of the guide grooves 14 is equal to the axial distance between the center of curvature O1 and the joint center O, and the amount of offset f of the center of curvature O2 of the guide grooves 24 is equal to the axial distance between the center of curvature O2 and the joint center O; thus the two are equal to each other. Therefore, the ball tracks defined by cooperation between the guide grooves 14 and 24 are wedge-shaped, with one axial end (in the illustrated embodiment, the opening side of the joint) opened.

A line segment connecting the center of curvature O1 of the guide grooves 14 of the outer joint member 10 and the center O3 of the torque transmitting ball 30 is equal in length to a line segment connecting the center of curvature O2 of the guide grooves 24 of the inner joint member 20 and the center O3 of the torque transmitting balls 30, such line segments being denoted by the reference character PCR in FIG. 5. When the outer and inner joint members 10 and 20 make an angular displacement through an angle θ, the cage 40 causes the torque transmitting balls 30 to be disposed in a plane bisecting the angle θ, thereby securing the constant velocity property of the joint.

The constant velocity joint of this embodiment has eight torque transmitting balls 30, which means that the load proportion per torque transmitting ball occupying the total load capacity of the joint is smaller than for the conventional joint (which is a 6-ball fixed type constant velocity joint, hereinafter the same); therefore, for the same nominal size of conventional joint, it is possible to reduce the diameter of the torque transmitting balls 30 so as to make the wall thicknesses of the outer and inner joint members 10 and 20 substantially equal to those in the conventional joint. Further, for the same nominal size of conventional joint, it is possible to achieve further compactness in terms of outer diameter while securing more than equal strength, load capacity and durability. Further, results of experiments have confirmed that the inventive joint generates less heat than the conventionally joint.

Figure 7:
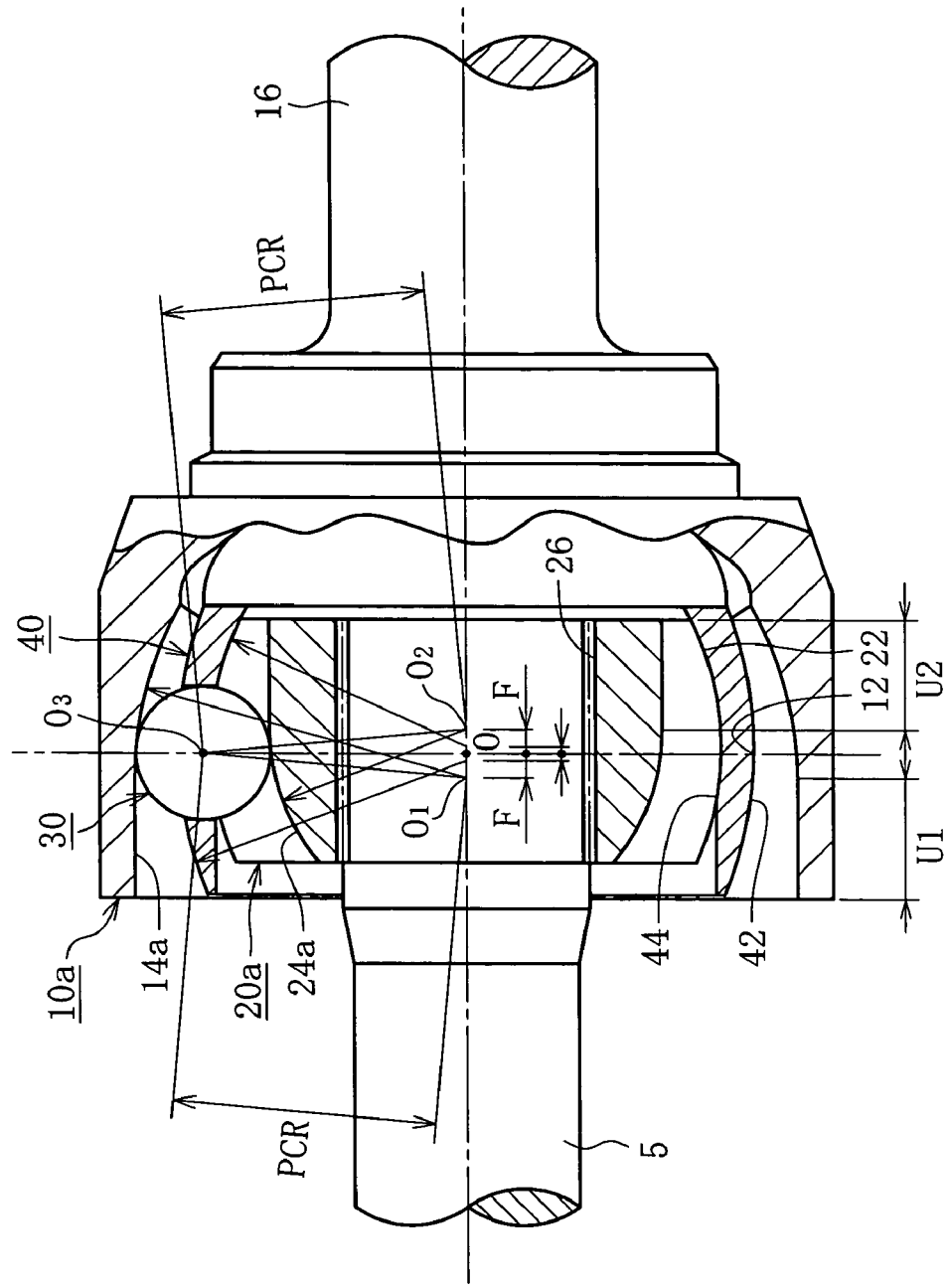
FIG. 7 is a longitudinal sectional view of a second fixed type constant velocity joint.

In an embodiment shown in FIG. 7, the guide grooves 14a of the outer joint member 10a and the guide grooves 24a of the inner joint member 20a are provided with straight sections U1 and U2, respectively, having a straight groove bottom, the rest of the arrangement being the same as in the embodiment shown in FIGS. 5 and 6 described above. The provision of the straight sections U1 and U2 enables the constant velocity joint of this embodiment to increase the maximum operating angle as compared with the embodiment shown in FIGS. 5 and 6.

Figure 1A:
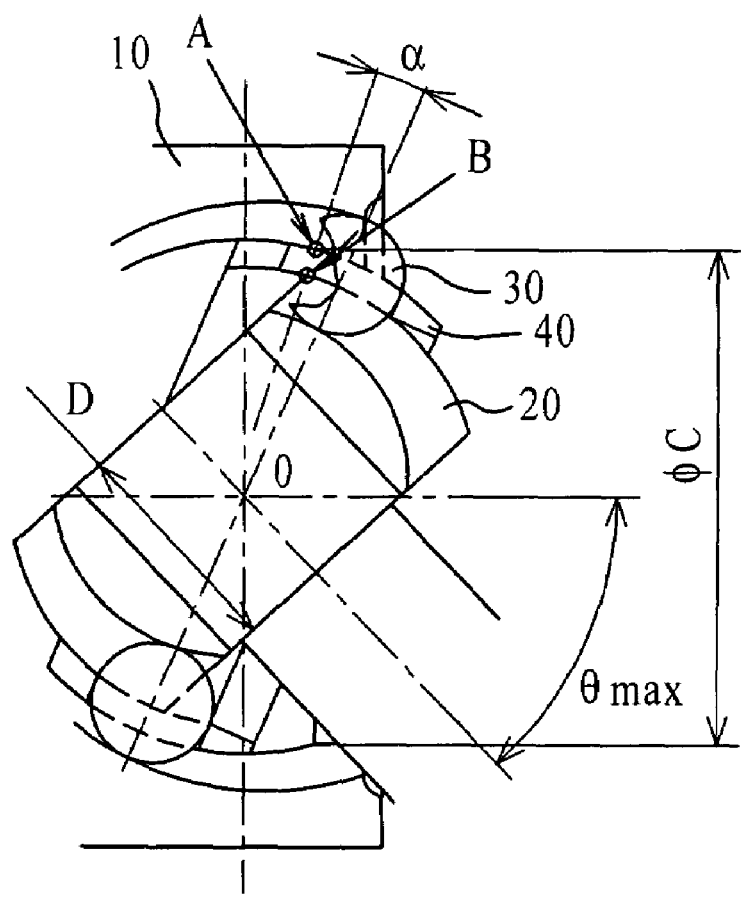
FIG. 1A is a sectional view of a first fixed type constant velocity joint (see FIGS. 5 and 6) taking a maximum operating angle.
Figure 1B:
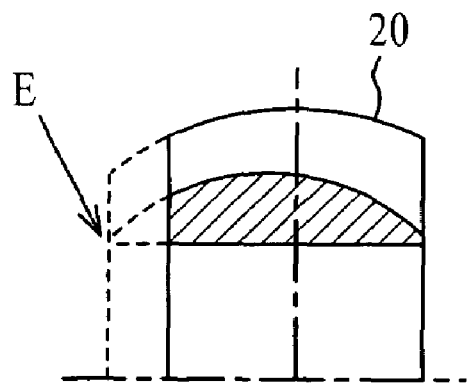
FIG. 1B is a sectional view of an inner joint member.
Figure 2A:
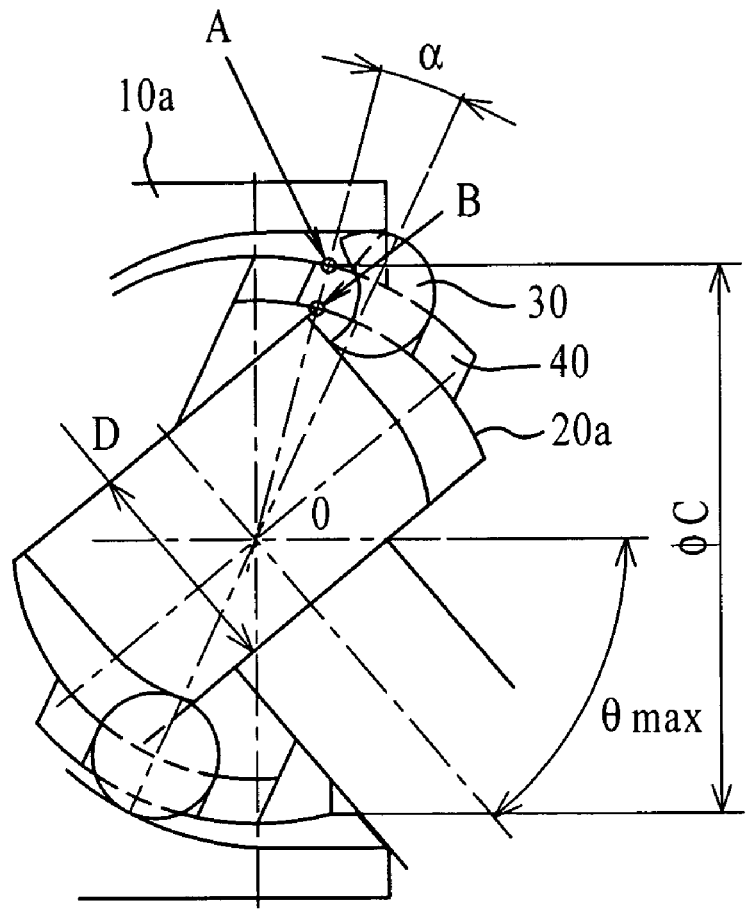
FIG. 2A is a sectional view of a second fixed type constant velocity joint (see FIG. 7) taking a maximum operating angle.
Figure 2B:
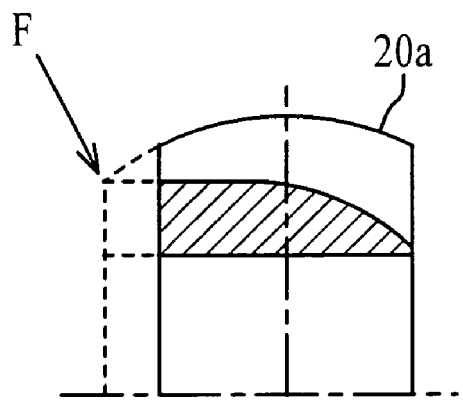
FIG. 2B is a sectional view of an inner joint member.

Next, the embodiments of the invention will be described with reference to FIGS. 1A to 2B. FIG. 1A shows the maximum operating angle (θmax) taken by the fixed type constant velocity joint in the embodiment shown in FIGS. 5 and 6. FIG. 2A shows the maximum operating angle (θmax) taken by the fixed type constant velocity joint in the embodiment shown in FIG. 7. As can be seen from FIGS. 1A and 2A, the factors which determine the amount of offset, axially of the cage, of the contact point A between the outer joint member 10, 10*a* and the cage 40 and the contact point B between the inner joint member 20, 20*a* and the cage 40 include the contact points A and B. In order to reduce the amounts of offset of the contact points A and B axially of the cage, it is contemplated that the socket diameter øC of the outer joint member 10, 10*a* may be reduced or that the width D of the inner joint member 20, 20*a* may be increased. However, from consideration of securement of the incorporatability of the cage 40, size reduction of the socket diameter øC is limited. Thus, the possibility of increasing the width D of the inner joint member 20, 20*a* will be investigated.

In addition, the width regulation of the inner joint member of the conventional fixed type constant velocity joint is set at a minimum value at which the contact ellipse of the torque transmitting balls does not swell out during high-angle operation, by taking weight reduction and cost reduction (input weight reduction) into consideration. When measured for angle α of the conventional article, the angle ranged from 19 degrees to 34 degrees or thereabout.

Figure 3:
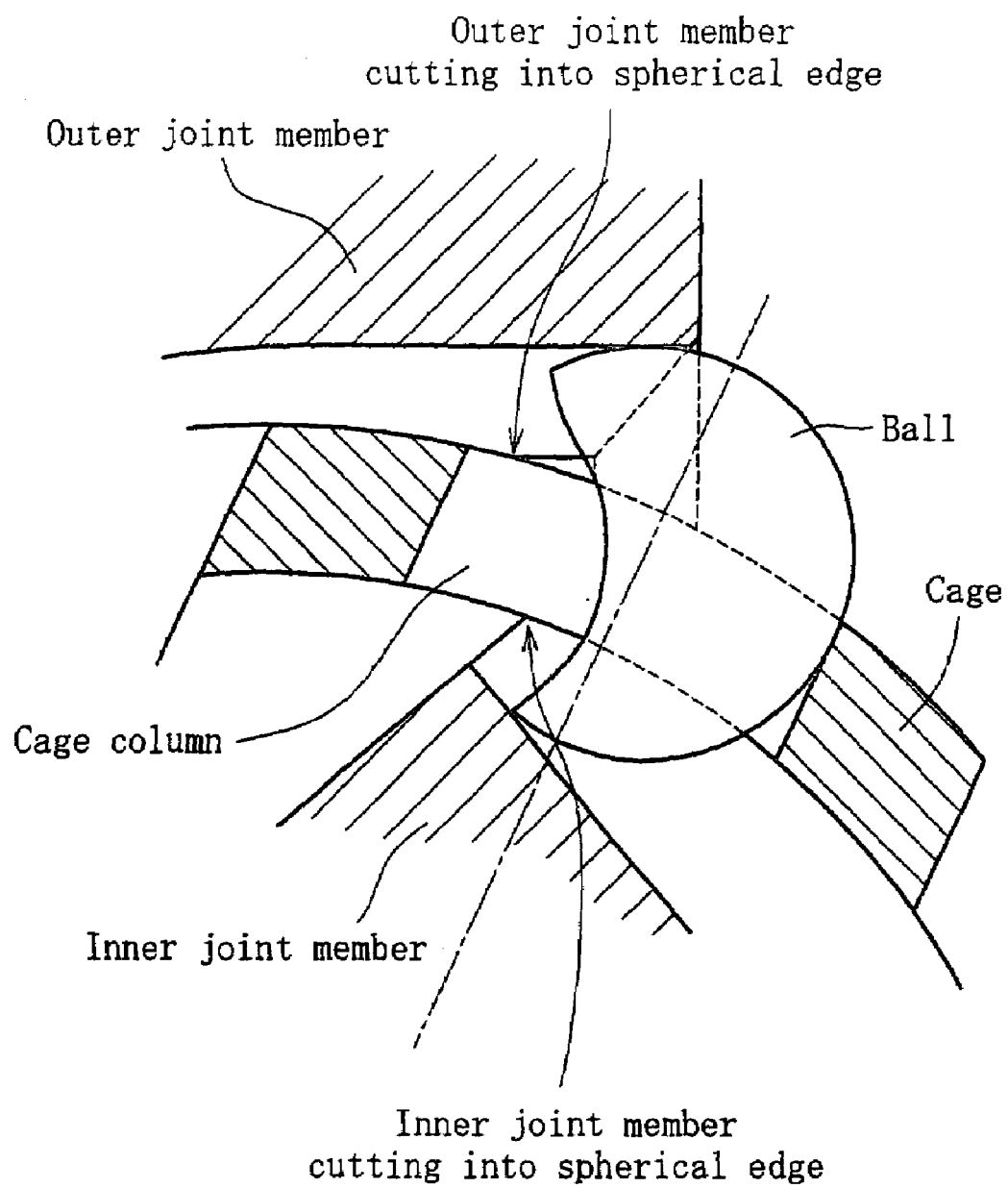
FIG. 3 is a sectional view of a fixed type constant velocity joint, in which the vicinity of a torque transmitting ball positioned outermost when taking a maximum operating angle is enlarged.
Figure 4:
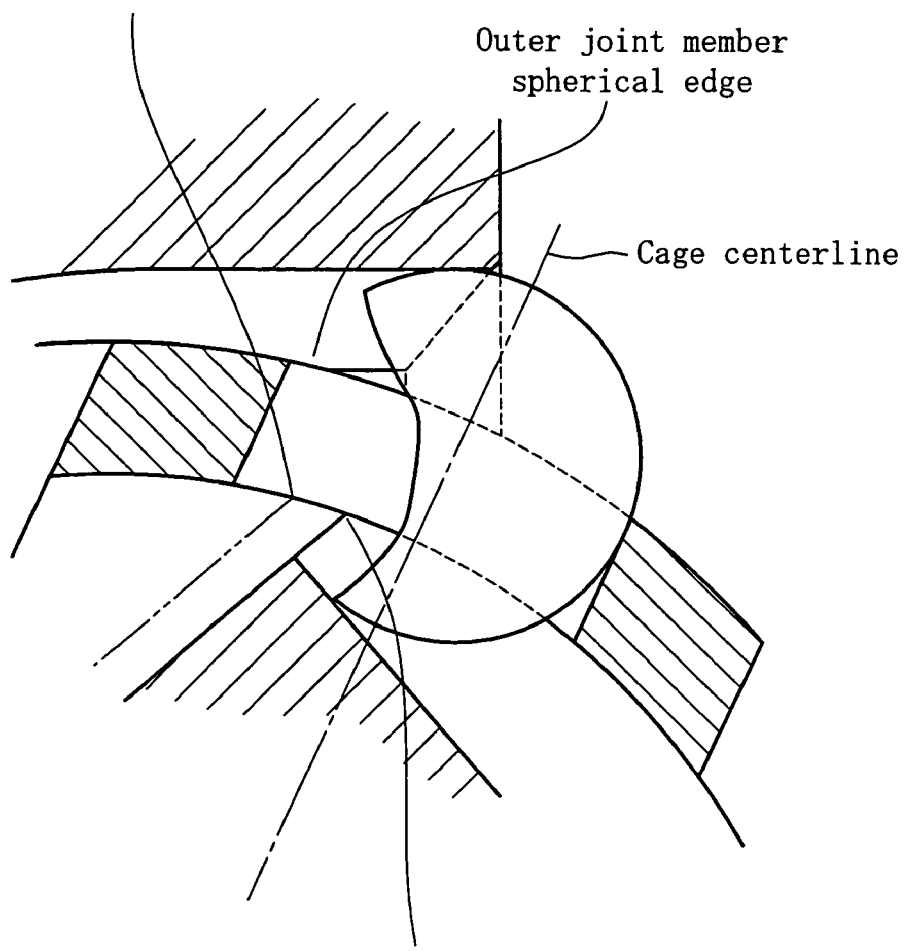
FIG. 4 is a sectional view similar to FIG. 3 for explaining the relation between the inner joint member edge position and shear stress.

FIG. 4 is substantially the same view as FIG. 3 described above, but showing that the shear stress acting on the cage column can be mitigated by axially extending the inner joint member as shown in phantom line so as to place the spherical edge of the outer joint member close to the spherical edge of the inner joint member. Further, it can be seen that if the amounts of offset of the points A and B as seen axially of the cage are regulated by the angle α formed between the straight line connecting the points A and B and the centerline of the cage, then the shear stress in the cage column is reduced by reducing the angle α. In other words, when the angle α is 0, that is, when the straight line connecting the points A and B is parallel with the cage centerline, the shear stress in the cage column is at its minimum.

The angle α is determined by the width D of the inner joint member 20, 20*a*. That is, in order to reduce the angle α, it is only necessary to set the width D at a large value as shown in broken lines in FIGS. 1B and 2B. However, since increasing the width D leads to an increase in the weight of the inner joint member 20, 20*a* and results in the E section (FIG. 1B) and F section (FIG. 2B) becoming sharp edges, it is necessary to keep the shape of the inner joint member 20, 20*a* optimum and to find the optimum value of angle α which mitigates the shear stress in the cage column.

Figure 8:
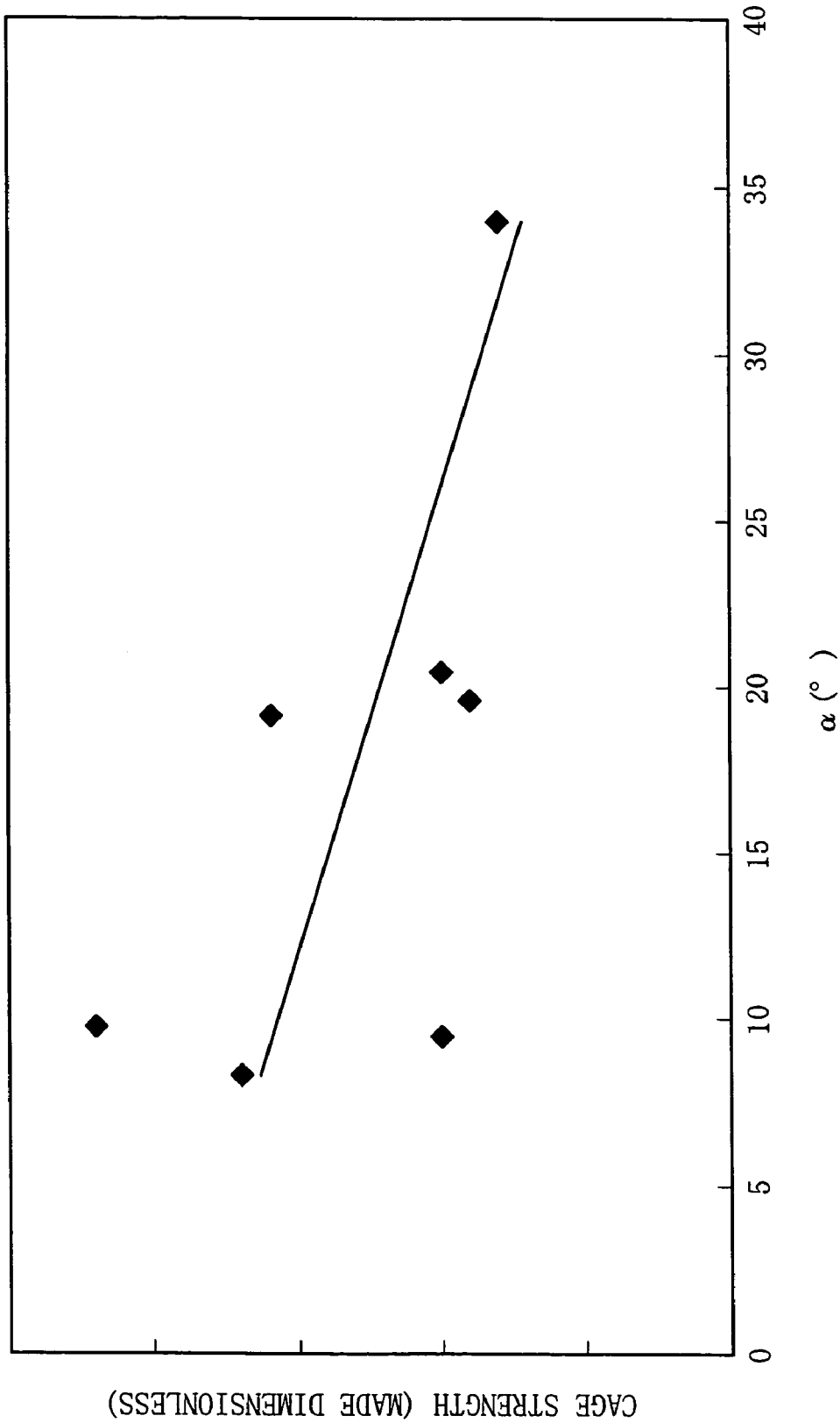
FIG. 8 is a diagram showing the relation between angle α and cage strength.
Figure 9A:
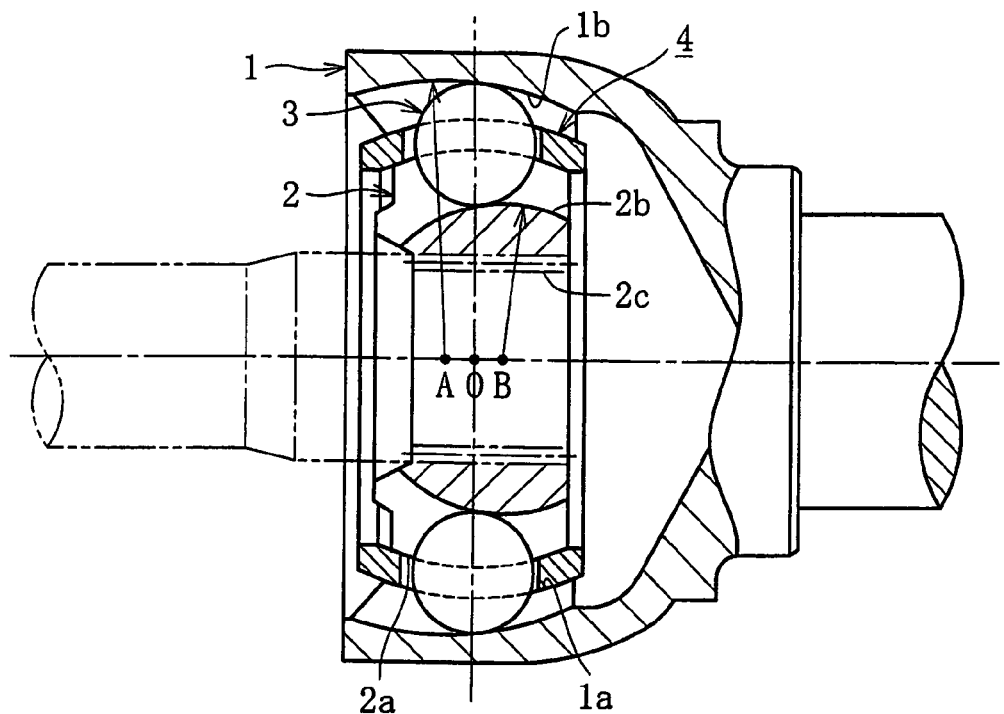
FIG. 9A is a longitudinal sectional view of a fixed type constant velocity joint showing the prior art.
Figure 9B:
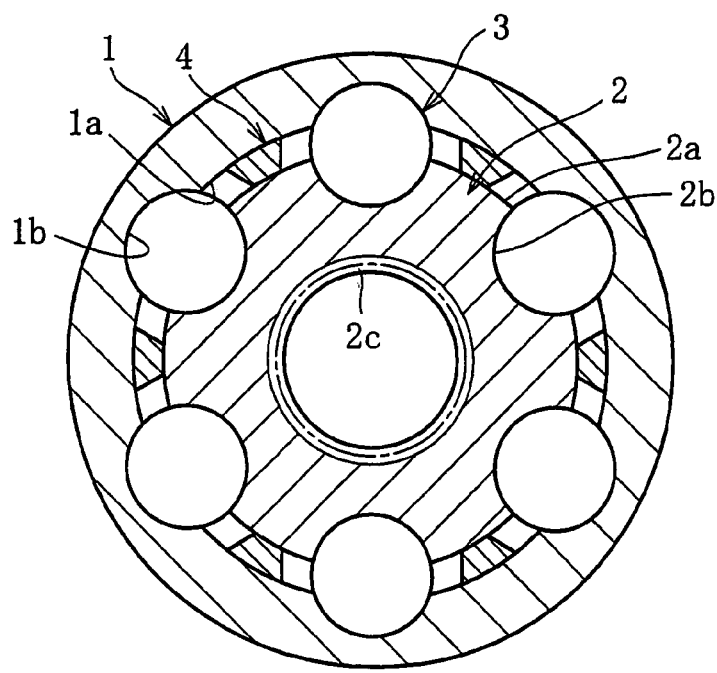
FIG. 9B is a cross sectional view of the joint shown in FIG. 9A.

A sample with α=10 degrees was prepared for experiment, and it was ascertained that the cage strength during high-angle operation improved by 5–14% as compared with the conventional article. The relation of strength to angle α is as shown in FIG. 8. In the actual design, since the width dimension D of the inner joint member 20, 20*a* is rounded, the value of α is not always an integer. In the case of an embodied article of the type shown in FIG. 7, the α, though differing from size to size, was 8.2–9.7 degrees or thereabout. In the case of the type shown in FIG. 5, there may be a case where the positional relation of the contact points A and B is reversed from what is illustrated so that α takes a minus value. It may be said from the above that the angle α is preferably not more than 10 degrees, more preferably not more than 10 degrees and not less than 8 degrees.

In addition, the invention has so far been described as applied to 8-ball type fixed type constant velocity joints shown by way of example; however, the invention is applicable also to a conventional 6-ball type to provide the same effect.

What is claimed is:

1. A fixed type constant velocity joint comprising:
an outer joint member having axially extending guide grooves formed in a spherical inner peripheral surface of the outer joint member;
an inner joint member having axially extending guide grooves formed in a spherical outer peripheral surface of the inner joint member;
torque transmitting balls disposed in corresponding ball tracks defined by the guide grooves of the outer joint member cooperating with the guide grooves of the inner joint member; and
a cage holding the torque transmitting balls,
wherein an angle (α) defined by a straight line connecting a contact point between the cage and the outer joint member and a contact point between the cage and the inner joint member, and the cage center line is in a range greater than zero degrees and not more than ten degrees when an angle of displacement between the inner and outer joint members, during which torque is transmittable, is at a maximum.

2. The fixed type constant velocity joint as set forth in claim 1, wherein the outer joint member and the inner joint member each have eight guide grooves.

3. The fixed type constant velocity joint as set forth in claim 1 or 2, wherein the guide grooves of the outer joint member and the guide grooves of the inner joint member are provided with straight sections having a straight groove bottom.

4. The fixed type constant velocity joint according to claim 1, wherein the angle (α) is in a range greater than eight degrees and not more than ten degrees.

* * * * *